United States Patent [19]

Inoue et al.

[11] Patent Number: 5,725,248
[45] Date of Patent: Mar. 10, 1998

[54] WEBBING HEIGHT ADJUSTER

[75] Inventors: Katsumi Inoue, Gamoh-gun; Kazutomo Isonaga, Wako, both of Japan

[73] Assignees: Takata Corporation; Honda Motor Co., Ltd., both of Tokyo, Japan

[21] Appl. No.: 687,200

[22] Filed: Jul. 25, 1996

[30] Foreign Application Priority Data

Aug. 2, 1995 [JP] Japan .................... 7-197424

[51] Int. Cl.$^6$ .................... B60R 22/20
[52] U.S. Cl. .................... 280/801.2; 297/483
[58] Field of Search .................... 280/801.2, 801.1, 280/808; 297/483

[56] References Cited

U.S. PATENT DOCUMENTS

| | | | |
|---|---|---|---|
| 4,861,071 | 8/1989 | Takada | 280/801.2 |
| 4,917,403 | 4/1990 | Gyoda et al. | 280/801.2 |

*Primary Examiner*—Paul N. Dickson
*Attorney, Agent, or Firm*—Kaensaka & Takeuchi

[57] ABSTRACT

A webbing height adjuster of the invention is formed of a movable member disposed on a guide rail on a vehicle to be slidable in the longitudinal direction; a lock pin disposed on the movable member to be movable in a direction of engaging and slipping off one of engaging portions of the guide rail; a control member slidably mounted on the movable member and having a pair of side walls to sandwich the lock pin; and a driven pin mounted on the lock pin to form a T-shape. Each of the side walls has a notching groove which opens in a direction of slipping of the lock pin from one of the engaging portions, and a cam face formed in the notching groove and engaging the driven pin. The control member controls the movement of the lock pin in the direction of engaging and slipping off by sliding relative to the movable member. The driven pin with the lock pin can be easily assembled with the movable member.

4 Claims, 9 Drawing Sheets

WEBBING HEIGHT ADJUSTER

BACKGROUND OF THE INVENTION

The present invention relates to a webbing height adjuster used in a seat belt device for a vehicle to adjust the height position of the webbing.

Vehicles such as automobiles are provided with seat belt devices mounted for seats of the vehicles. A three-point type seat belt device is an example of such a conventional seat belt device. The three-point type seat belt device comprises a shoulder belt for restraining the shoulder, chest, and abdomen of a vehicle occupant, and a lap belt continuously formed with the shoulder belt for restraining the hip of the occupant.

It is desirable that the webbing constituting the seat belt is worn by the occupant in such a position so as to fit the occupant as much as possible, in order to effectively restrain the occupant in an emergency and to allow the occupant to be in comfort without a sense of oppression. Because the shoulder belt supports the portion from the shoulder to the abdomen through the chest of the occupant, the shoulder belt is particularly desirable to be in such a position so as to fit the occupant. On the other hand, there is a wide variety of people who sits in the seat, such as a child, an adult of a big body, an adult of a small body and so on, that is, the body sizes of occupants are, of course, different. Therefore, the seat belt device is previously provided with a webbing height adjuster which can adjust the height position of the webbing for each occupant to allow the webbing to fit the body of the occupant.

A webbing height adjuster disclosed in Japanese Unexamined Published Patent Application No. H1-273749 is one of such conventional webbing height adjusters.

As shown in FIG. 12, the webbing height adjuster comprises a guide rail 102 fixed to a vehicle body and provided with a predetermined number of positioning recesses 101 vertically disposed in line, a slider 105 slidably disposed on the guide rail 102 and provided with a slip joint 104 guiding the webbing 103, an operational button 108 disposed on the slider 105 in such a manner as to allow the operational button 108 to slide in a predetermined range and provided with a pair of side walls 107 forming a hollow portion, a lock pin 109 slidably disposed on the slider 105, one end of which is inserted into the hollow portion 106 of the operational button 108 in such a manner as to allow the relative movement thereof and the other end is engagable to one of the positioning recesses 101 of the guide rail 102, a pin 111 fixed to an end of the lock pin 109 and crossing between right-angled triangular holes 110 formed in a pair of side walls 107, respectively, of the operational button 108, and a return spring 112 always biasing the lock pin 109 to the positioning recesses 101.

Suppose the webbing height adjuster as structured above is in state a where the lock pin 109 shown in this figure is engaged in the uppermost positioning recess 101. By pressing the operational button 108 downward by manual, the operational button 108 slides downward relative to the slider 105 and the pin 111 is therefore guided by slant faces 113 of the triangular holes 110 to move rightward in this figure against the biasing force of the return spring 112. The rightward movement of the pin 111 causes the lock pin 109 to move rightward so that the lock pin 109 slips off the uppermost positioning recess 101. Therefore, the slider 105 is now slidable relative to the guide rail 102. By further pressing the operational button 108 downward, the slider 105 slides down together with the operational button 108 being guided by the guide rail 102. By releasing the operational button 108 when the lock pin 109 is positioned at the level of the best positioning recess 101 to fit the body of the vehicle occupant, the operational button 108 slides upward relative to the slider 105 by the biasing force of a return spring 114 and the lock pin 109 therefore moves leftward by the biasing force of the return spring 112 so as to engage the positioning recess 101. In such a manner, the webbing 103 is adjusted to the best position to fit the body of the occupant.

By the way, in the webbing height adjuster as mentioned above, it is conceivable that the pin 111 is previously fixed to the lock pin 109 before assembling the operational button 108, the lock pin 109, the pin 111, and the return spring 112 to the slider 105 in order to decrease the number of assembly steps. However, the lock pin 109 with the pin 111 already fixed thereto cannot pass through the slider 105. Therefore, a portion to which the pin 111 is fixed (hereinafter, referred to the "pin-fixed portion") of the lock pin 109 must be inserted into the slider 105 to the operational button 108 side to face the triangular holes 110 of the operational button 108 first and in this state, the pin 111 is fixed to the lock pin 109. It not only increases the number of assembly steps but also takes a lot of time to position the pin-fixed portion of the lock pin 109 because the pin-fixed portion must be faced to the triangular holes 110 against the biasing force of the return spring 112, thereby making the assembly of the lock pin 109 difficult.

In such a webbing height adjuster, the return spring 112 biasing the lock pin 109 is accommodated in the slider 105 at the guide rail 102 side, and the operational button 108 is disposed on the slider 105 at the opposite side of the guide rail 102. This increases not only the thickness of the webbing height adjuster but also the length of the lock pin 109 since the pin 111 fixed to the lock pin 109 is designed to cross between the triangular holes 110 in the side walls 107 of the operational button 108. As a result, when the webbing height adjuster is mounted on a narrow portion of the vehicle body such as a center pillar, it is difficult and takes a lot of time to mount the webbing height adjuster.

Since the triangular holes 110 of the operational button 108 and the pin 111 crossing between the triangular holes 110 are exposed to the cabin, thereby making the appearance worse.

To overcome such problems, it is conceivable that by providing a cover for covering the pin 111 and making the return spring 112 to penetrate the slider 105 to be supported by the cover to allow the pin 111 to be fixed to a portion, near the guide rail 102, of the lock pin 109, the length of the lock pin 109 so that is shortened, the thickness of the webbing height adjuster is decreased, and the pin 111 is disappeared from the occupant.

However, in case of such a cover provided, the triangular holes 110 and the pin 110 of the lock pin 109 are disappeared by the cover so that it is almost impossible to fix the pin 111 to the lock pin 109 with the pin 111 being inserted into the triangular holes 110 after assembling the operational button 108, the lock pin 109, the return spring 112, and the cover to the slider 105. Therefore, it is conceivable that the pin 111 is previously fixed to the lock pin 109 and the lock pin 109 with the pin 111 is then assembled. In this case, it necessitates to insert the pin 111 into the hollow portion 106. However, since the pin 111 comes into contact with the pair of side walls 107 with the pin 111 being oriented in such a direction as to be supported between the side walls 107, the pin 111 must be inserted into the hollow portion 106 with the pin being oriented vertically, i.e. with the lock pin 109 being rotated at a predetermined angle, and the lock pin 109 must be rotated in such a manner that the pin 111 faces the triangular holes 110 and extends in such a direction as to cross between the side walls 107. Therefore, it is difficult and takes a lot of time to assemble the lock pin 109 as well as the case mentioned above.

SUMMARY OF THE INVENTION

The object of the present invention is to provide a webbing height adjuster having an improved assembly property of a lock pin which allows the lock pin to be quite easily assembled.

Another object of the present invention is to provide a webbing height adjuster in which a driven pin of a lock pin is disappeared from outside.

For accomplishing the object, a webbing height adjuster of the invention comprises: a guide rail fixed to a vehicle body and provided with a predetermined number of engaging portions formed in the longitudinal direction; a movable member disposed on the guide rail in such a manner as to be slidable in the longitudinal direction and on which a webbing support is mounted; a lock pin disposed on the movable member in such a manner as to be movable in a direction of engaging and slipping off one of the engaging portions; a biasing means always biasing the lock pin in a direction of engaging one of the engaging portions; a control member slidably mounted on the movable member and having a pair of side walls provided with cam faces, respectively, to sandwich the lock pin, for controlling the movement of the lock pin in the direction of engaging and slipping off by sliding relative to the movable member; and a driven pin mounted to the lock pin to form a T-like shape together with the lock pin and both ends of which engage the cam faces, respectively to be driven by the movement of the cam faces due to the sliding of the control member, wherein the pair of side walls is each provided with a notching groove formed therein and the each cam face is formed in the notching groove.

The movable member is provided with a covering member at a position where the lock pin is mounted, and the covering member is formed in a box-like shape having a rectangular section comprising a bottom plate, both side plates, and a top plate and is opened in the sliding direction of the control member, a portion of the lock pin passes through the bottom plate of the covering member to be positioned inside the covering member, the bottom plate of the covering member is provided with a first opening allowing the driven pin to pass therethrough in such a direction that the driven pin engages the cam faces, and the control member is slidably mounted to the covering member.

The covering member is provided with a cylindrical column between the bottom plate and the top plate, a portion of the lock pin positioned inside the covering member is slidably inserted into the column, and the column is provided with a second opening allowing the sliding of the driven pin and formed continuously with the first opening of the bottom plate in the longitudinal direction of the column.

In the webbing height adjuster as structured above according to the present invention, for assembling the lock pin, in which the driven pin is previously assembled to form together T-like shape, to the control member, the lock pin is held against the biasing force of the biasing means with the driven pin being laid in such a direction as to engage the cam faces and being positioned allowing the pair of side walls of control member to pass through a space between the driven pin and the movable member. After the pair of side walls is positioned between the driven pin and the movable member, the holding of the lock pin is released so that the lock pin moves due to the biasing force of the biasing means, thereby engaging the driven pin with the cam faces of the pair of side walls of the control member. In this manner, the lock pin is assembled to the control member. Therefore, it is no longer necessary to rotate the lock pin in such a manner as to lay the driven pin in the longitudinal direction of the control member, that is, in the direction different from such a direction as to engage the cam faces. Therefore, the rotational operation of the lock pin is not necessary, thereby facilitating the assembly of the lock pin very much and decreasing the number of the working steps in the assembly line.

Furthermore, since the driven pin is positioned in the covering member, the driven pin is hidden by the covering member, thereby improving the appearance.

In addition, since the lock pin is guided by the inner surface of the column, the lock pin can smoothly and securely move.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 1:
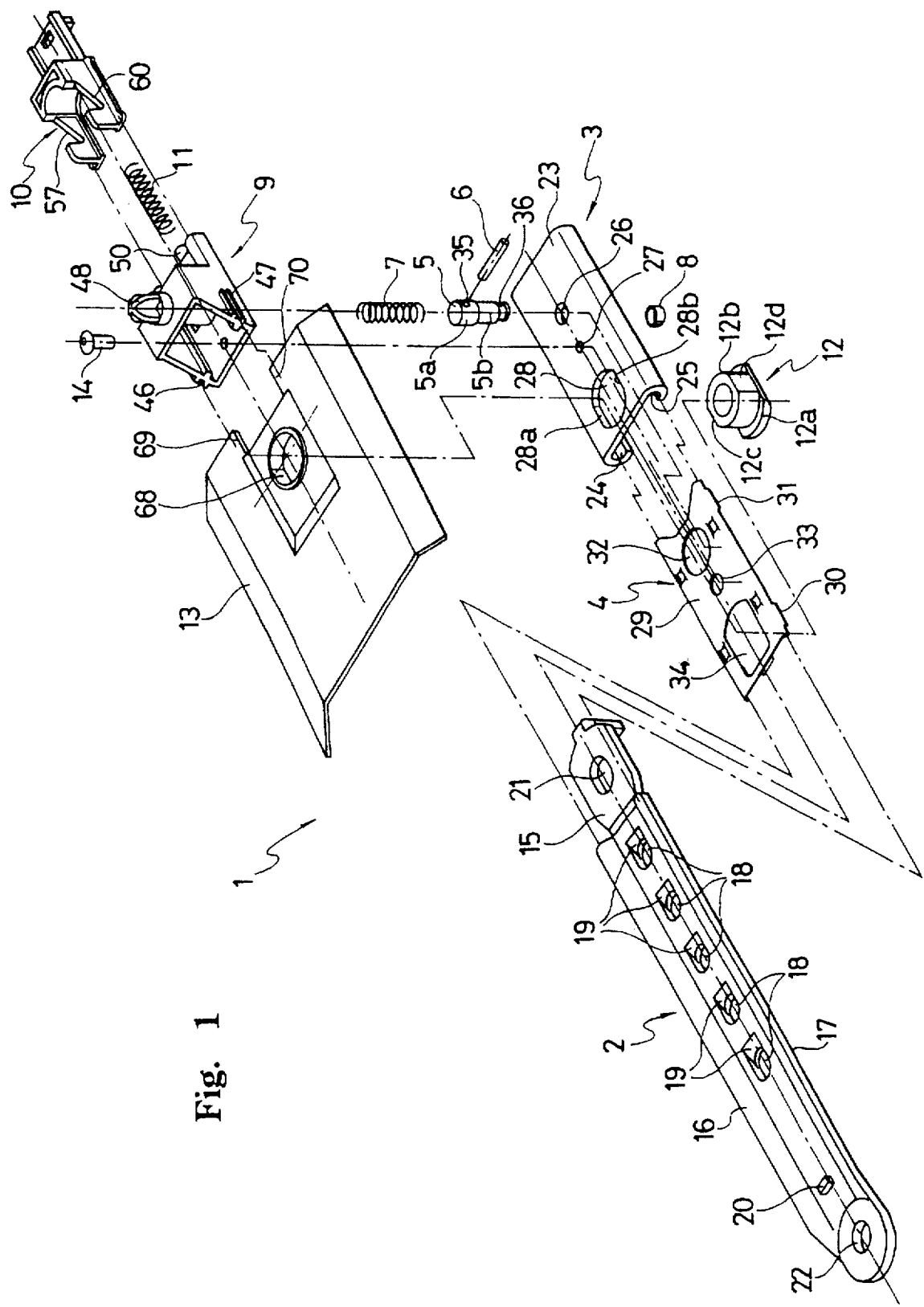
FIG. 1 is a exploded perspective view showing an embodiment of a webbing height adjuster according to the present invention.

As shown in FIG. 1, a webbing height adjuster 1 of this embodiment comprises a guide rail 2, a lock pin adjusting slider 3 comparable to the movable member of the present invention, a backlash and noise eliminator 4, a lock pin 5, a driven pin 6, a lock pin biasing spring 7, a collar 8, a covering member 9, a lock pin control slider 10 comparable to the control member of the present invention, a return spring 11, a nut 12, and a covering plate 13, and a rivet 14.

The guide rail 2 has a metal flat bar like body 15 and a pair of rail portions 16 and 17 formed along the both side edges of the body 15 by bending the both side edges to extend in the longitudinal direction in parallel with each other. The central portion of the body 15 is provided with a predetermined number of engaging holes 18, 18, . . . (in the shown case, five engaging holes) formed in line and equally spaced. As also clearly shown in FIG. 2, the body has slopes 19, 19, . . . disposed on the right edges, in FIG. 1, of the engaging holes 18, 18, . . . to slope downward to the engaging hole 18, 18, . . . , respectively. These engaging holes 18, 18, . . . are comparable to the engaging members of the present invention. The body 15 is also provided with a projection-like stopper 20 formed in a left end portion, in FIG. 1, of the central portion thereof by heaping up a portion of the central portion. The body 15 is further provided with mounting holes 21, 22, into which mounting bolts 77, 78 (shown in FIG. 2) are inserted, respectively, formed in left and right end portions, in FIG. 1, of the central portion thereof.

The lock pin adjusting slider 3 has a metal rectangular body 23 and a pair of grooves 24, 25 formed along the both side edges of the body 23 by bending the both side edges in a U-like shape to extend in the longitudinal direction in parallel with each other. The grooves engage the pair of rail portions 16, 17 of the guide rail 2, respectively to slide along them. The central portion of the body 23 is provided with a through hole 26 through which the lock pin 5 is inserted in such a manner that the lock pin 5 is slidable relative to the body 23, a rivet hole 27 through which the rivet 14 is inserted, and a nut through hole 28 through which the nut 12 is inserted. The nut through hole 28 has a pair of flat faces 28a, 28b formed on the inner periphery to extend in the longitudinal direction in parallel with each other.

The backlash and noise eliminator 4 has a resin rectangular plate-like body 29 and U-like groove forming parts, two of which are formed on each side of the body 29 (In FIG. 1, though only two groove forming parts 30, 31 on one side of the body 29 are shown, other two groove forming parts are formed on the other side in the same manner). The U-like groove forming parts engage the inner surfaces of the pair of grooves 24, 25 of the lock pin adjusting slider 3. The body 29 is provided with circular holes 32, 33 and a rectangular hole 34 formed in the central portion thereof in positions corresponding to the positions of the through hole 26, the rivet hole 27, and the nut through hole 28 of the lock pin adjusting slider 3, respectively. The circular holes 32, 33 are formed to have larger diameters than the diameters of the corresponding through hole 26 and the rivet hole 27. The rectangular hole 34 is formed in substantially the same configuration of the head portion 12a of the nut 12 so that the head portion 12a can be freely inserted into the rectangular hole 34. The backlash and noise eliminator 4 is designed to be in close contact with the surface of the lock pin adjusting slider 3, on which the pair of U-like grooves 24, 25 are formed, by elastic stress resulting form slight deformation of the backlash and noise eliminator 4 itself in such a positions that the holes 32, 33, 34 correspond to the holes 26, 27, 28, respectively.

The lock pin 5 is formed in a cylindrical shape with a step comprising large- and small-diameter parts. The large-diameter part 5a of the lock pin 5 is provided with a through hole 35 formed in the radial direction and the small-diameter part 5b is provided with an annular groove 36. The lock pin 5 and the driven pin 6 are assembled to form together T-like shape by inserting the driven pin 6 into the through hole 35 of the lock pin 5 (as shown in FIG. 5) and the C-like collar 8 is engaged to the annular groove 36 to form a periphery flush with the periphery of the small-diameter part 5b.

Figure 3:
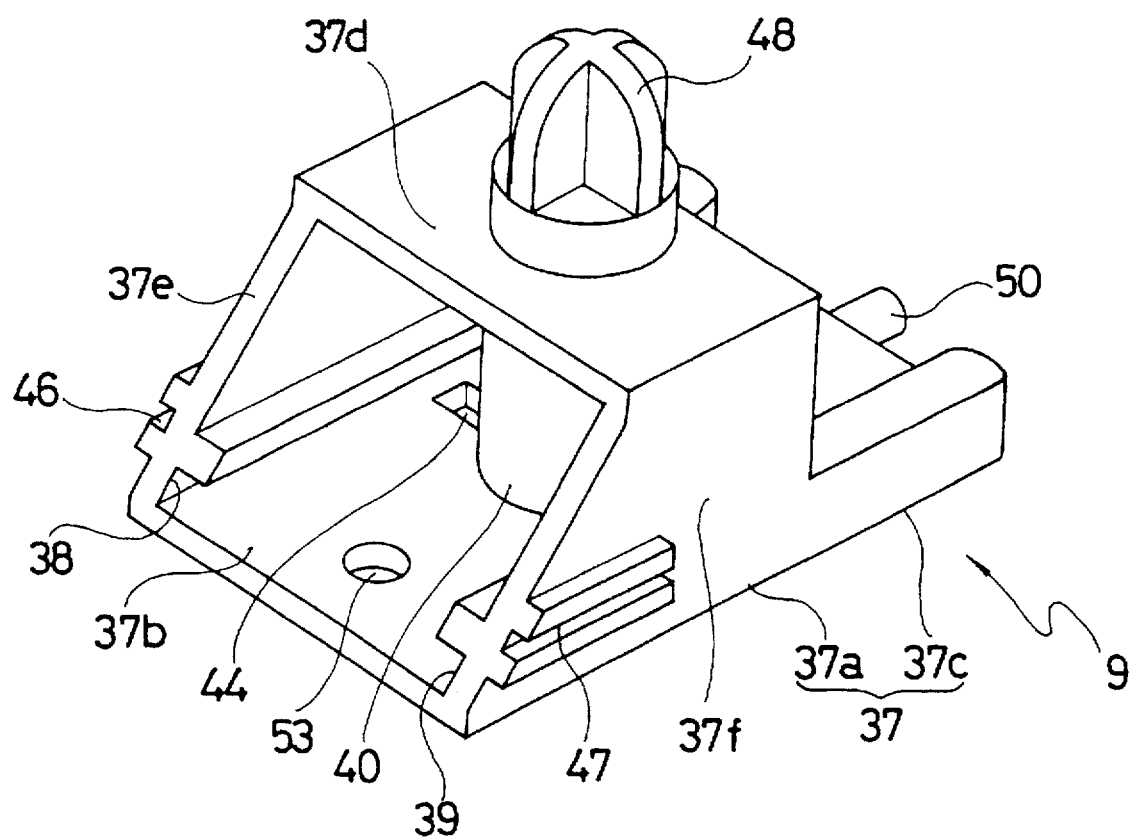
FIG. 3 is a perspective view of a covering member used in the embodiment shown in FIG. 1.

As shown in FIG. 3, the covering member 9 has a body 37 made of resin wherein a half in the longitudinal direction is a box-like portion 37a having a rectangular section and the other half comprises a slab portion 37c integrated with a bottom plate 37b of the box-like portion 37a. The box-like portion 37a increases the strength of the covering member 9, that is, the box-like portion 37a acts as a reinforcement of the operational unit of the webbing height adjuster 1. The body 37 is provided with a pair of guide grooves 38, 39 extending in the longitudinal direction in parallel with each other. As described later, the lock pin control slider 10 is guided by the guide grooves 38, 39 to slide.

Figure 4:
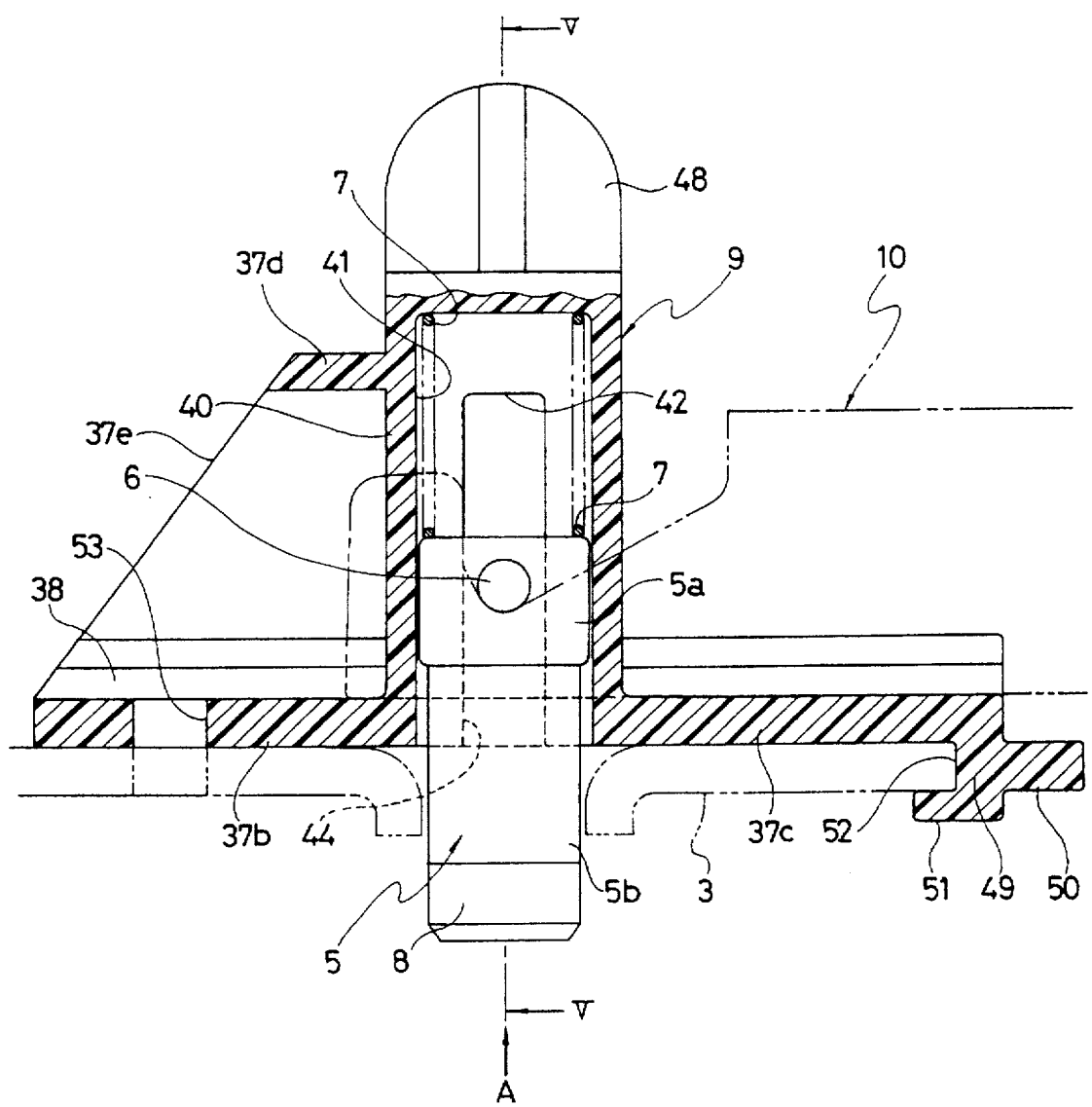
FIG. 4 is a side view, partly broken away, of the covering member shown in FIG. 3.

As shown in FIG. 4 in detail, the cylindrical column 40 is disposed in the center of the box-like portion 37a of the body 37 to stand straight on the bottom plate 37b to project from a top plate 37d. The column 40 and the bottom plate 37b have an axial slot 41 with bottom, opening at the a bottom, and an plate 37b side, a section of which is circular. The diameter of the axial slot 41 is designed to allow the large-diameter part 5a of the lock pin 5 to be slidably inserted into the axial slot 41. In addition, as shown in FIG. 4 and FIG. 5 in detail, the column 40 is provided with a pair of openings 42, 43 formed in side walls extending perpendicular to the longitudinal direction of the body 37 to extend in the longitudinal direction of the column 40 so as to allow the communication between the axial slot 41 to the outside of the column 40. Moreover, as clearly shown in FIG. 6, the bottom plate 37b is provided with a pair of openings 44, 45 extending perpendicular to the longitudinal direction of the body 2 to communicate with the openings 42, 43. The openings 42, 43 are designed in size to allow the driven pin 6 to be inserted to slide along the openings 42, 43 and the openings 44, 45 are designed in size to allow the passage of the driven pin 6.

Figure 5:
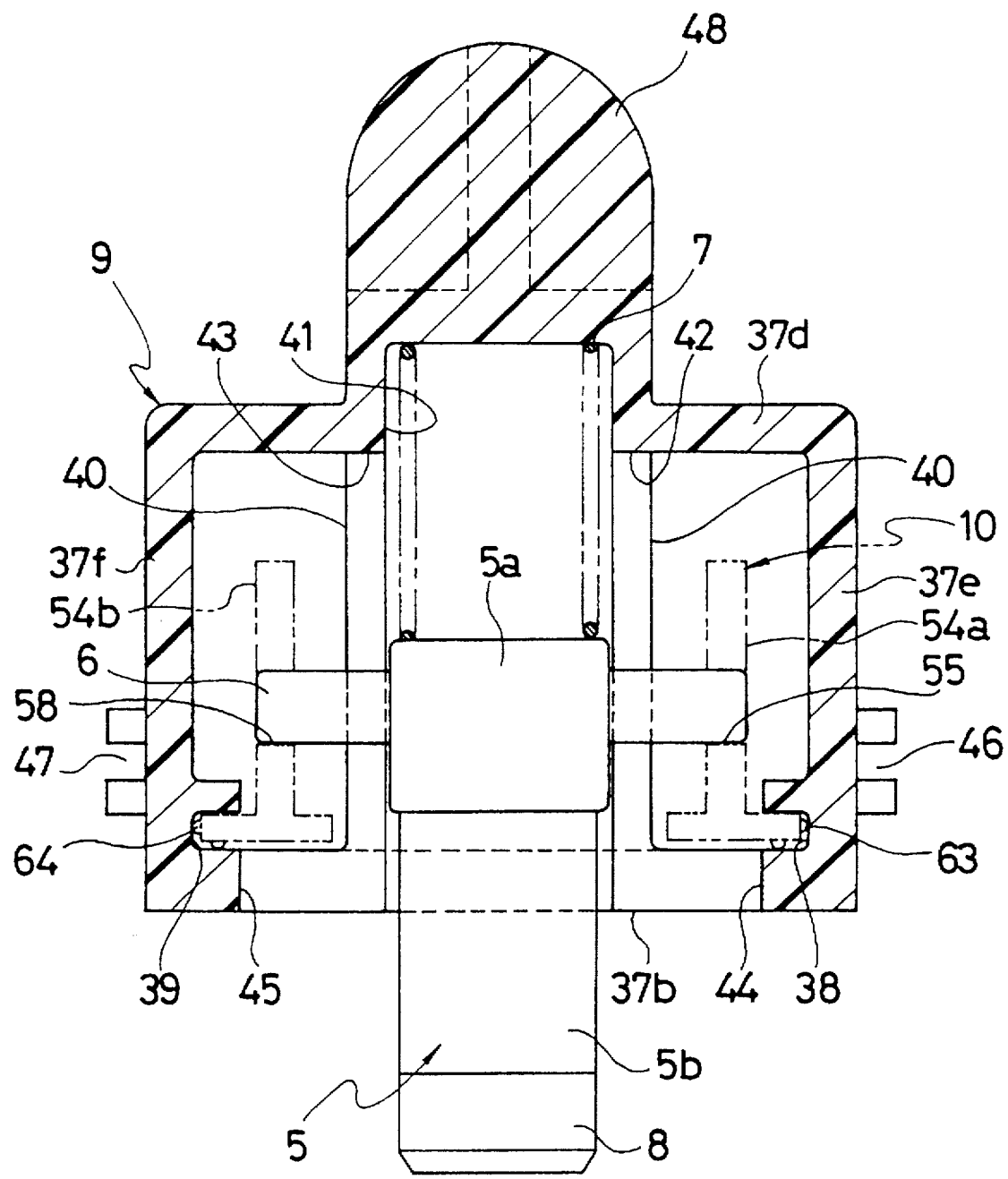
FIG. 5 is a sectional view taken along the line V—V in FIG. 4.
Figure 6:
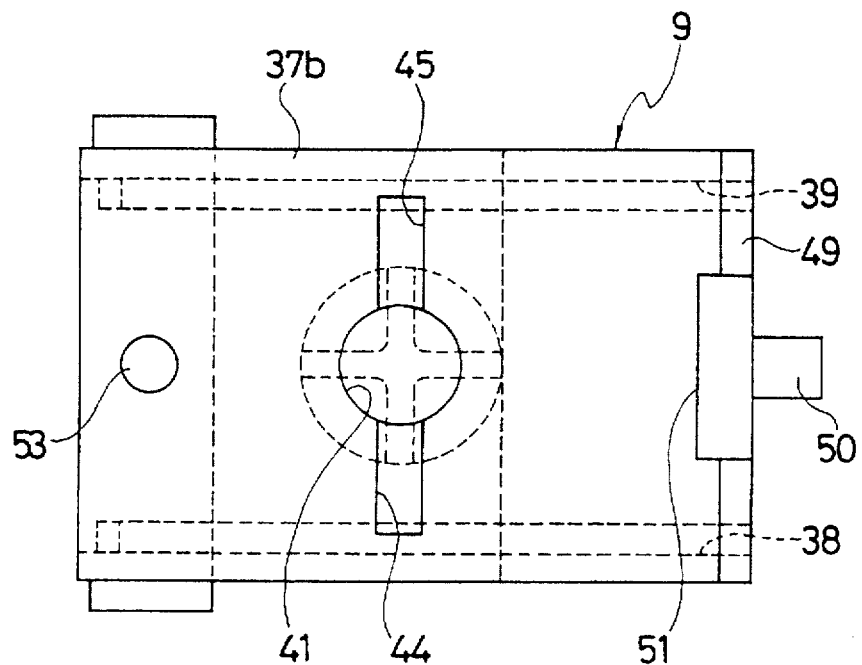
FIG. 6 is a bottom view of the covering member shown in FIG. 3.

As shown in FIG. 4 and FIG. 5, the lock pin 5 is slidably inserted into the axial slot 41 and the lock pin biasing spring 7 is accommodated between the lock pin 5 and the bottom of the axial slot 41. On the other hand, the box-like portion 37a has side plates 37e, 37f on the both sides, which have mounting grooves 46, 47 formed on the outer surfaces thereof, respectively, in the longitudinal direction. The column 40 is provided with a slider garnish mount portion 48. Further, as shown in FIG. 4 and FIG. 6, the slab portion 37c has a vertical wall 49 extending downward from the edge of the slab portion 37c. The vertical wall 49 is provided with a spring support projection 50 formed in the center thereof in the longitudinal direction for supporting one end of a return spring 11. Moreover, the vertical wall 49 is provided with a projection 51 extending toward the box-like portion 37a, thereby forming an engaging groove 52 into which one end of the body 23 of the lock pin adjusting slider 3 is inserted. The bottom plate 37b of the box-like portion 37a is provided with a rivet hole 53 into which the rivet 14 is inserted.

Figure 7:
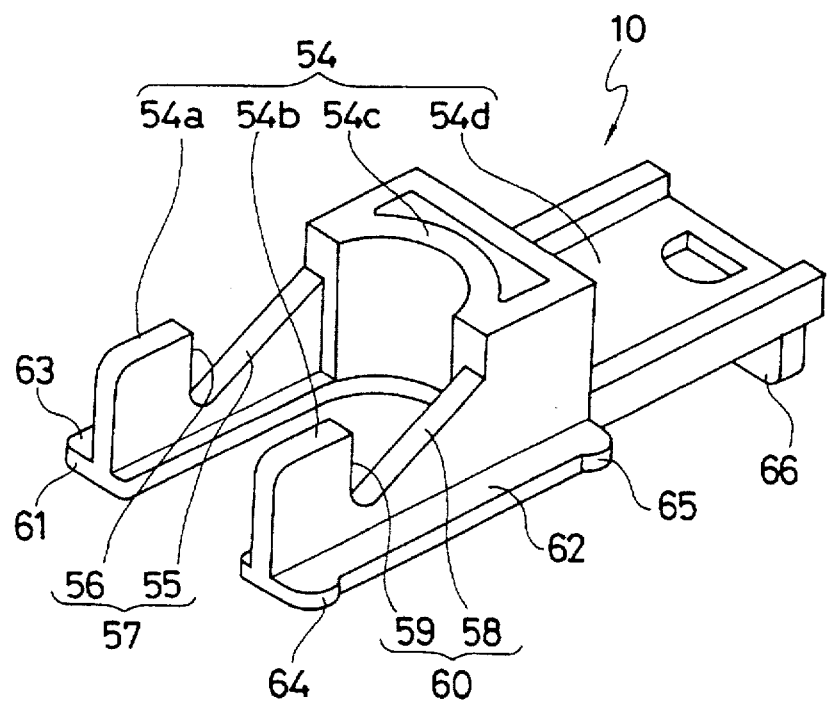
FIG. 7 is a perspective view of a lock pin control slider used in the embodiment shown in FIG. 1.

As shown in FIG. 7, the lock pin control slider 10 has a body 54 made of resin to have two legs which comprises a pair of side walls 54a, 54b, a connection 54c connecting the both side walls 54a and 54b, a slab portion 54d extending from the connection 54c in the longitudinal direction. One side wall 54a is provided with a cam groove 57 opening upward comprising a slant face 55 and a vertical face 56 and the other side wall 54b is also provided with a cam groove 60 opening upward comprising slant face 58 and a vertical face 59. The cam grooves 57, 60 are comparable to the notching grooves of the present invention and the slant faces 55, 58 are comparable to the cam faces of the present invention.

Figure 2:
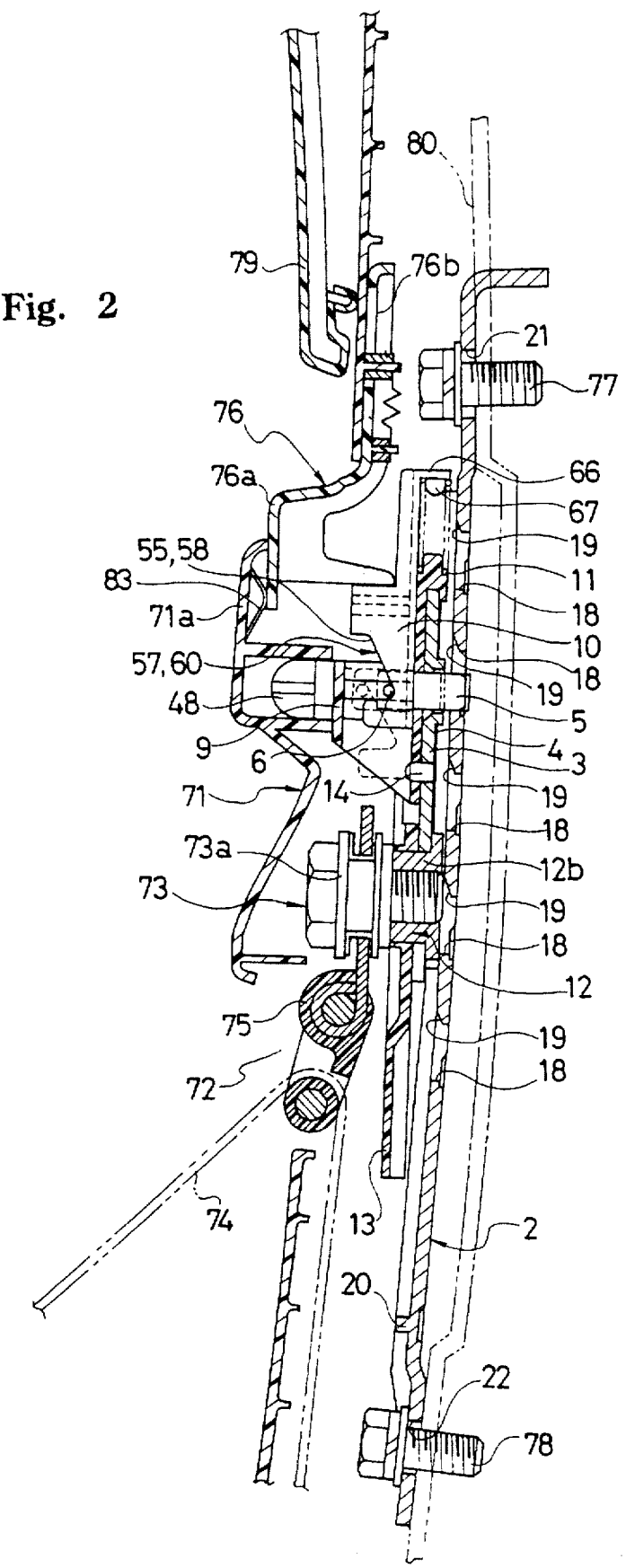
FIG. 2 is a longitudinal sectional view of the embodiment shown in FIG. 1.

The body 54 of the lock pin control slider 10 further comprises guides 61, 62 at the lower ends of the pair of side walls 54a, 54b, respectively, which are slidably engaged in the guide grooves 38, 39 of the covering member 9. Each guide 61, 62 has two small projections 63, 64, 65 (one small projection of the guide 61 is not shown and not marked) on an outer edge thereof, which come in contact with the vertical wall of each guide groove 38, 39. The distance between the guides 61 and 62 is set to be longer than the outer diameter of the column 40. The slab portion 54d is provided with a vertical wall 66 standing downward from the lower surface at the end thereof. As shown in FIG. 2, the vertical wall 66 is provided with a spring support projection 67 at the center thereof projecting in the longitudinal direction for supporting the other end of the return spring 11.

The nut 12 comprises the head portion 12a and a thread portion 12b and has a pair of flat faces 12c, 12d parallel to each other formed by cutting linearly outer peripheries of the head portion 12a and the thread portion 12b. The thread portion 12b is inserted into the nut through hole 28 of the lock pin adjusting slider 3 and, at the same time, the head portion 12a is engaged in the rectangular hole 34 of the backlash and noise eliminator 4. In this state, the flat face 12c of the nut 12 faces the flat face 28a of the lock pin adjusting slider 3 and the flat face 12b of the nut 12 faces the flat face 28b of the lock pin adjusting slider 3 so that the nut 12 is prevented from rotating relative to the lock pin adjusting slider 3.

The covering plate 13 has a through hole 68 into which the nut 12 is inserted not allowing the relative rotation and engaging portions 69, 70 which are engaged in the mounting grooves 46, 47 of the box-like portion 37a. As shown in FIG. 2, the covering plate 13 is disposed not to allow the guide rail 2 to be seen from the cabin through a webbing through hole 72 of the slider garnish 71.

Figure 8:
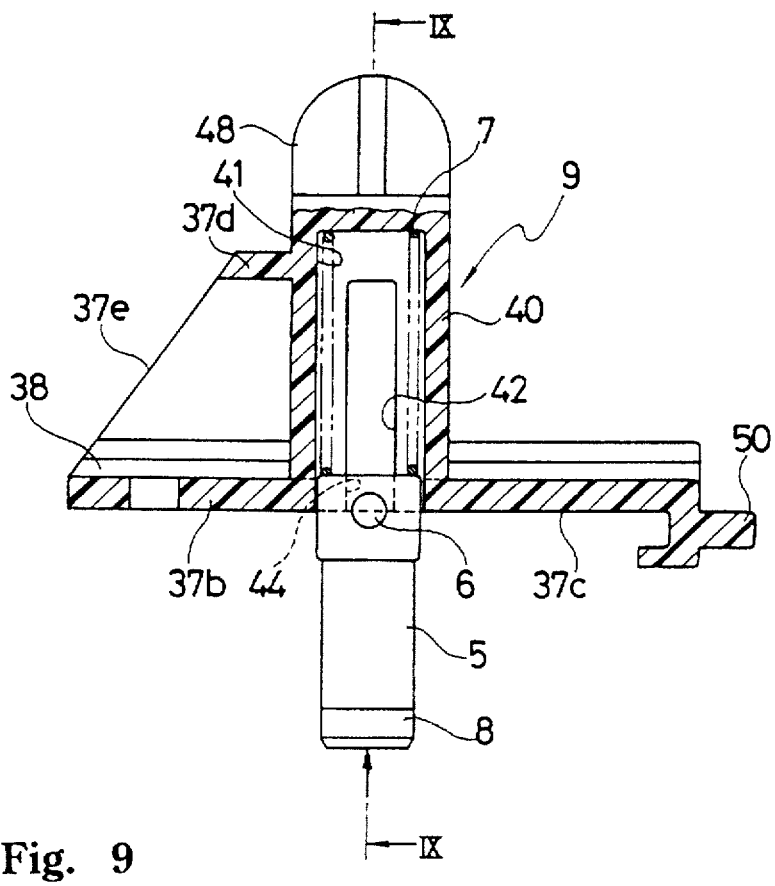
FIG. 8 is a view for explaining the assembling operation of the lock pin and illustrating the start of the assembling operation of the lock pin.
Figure 9:
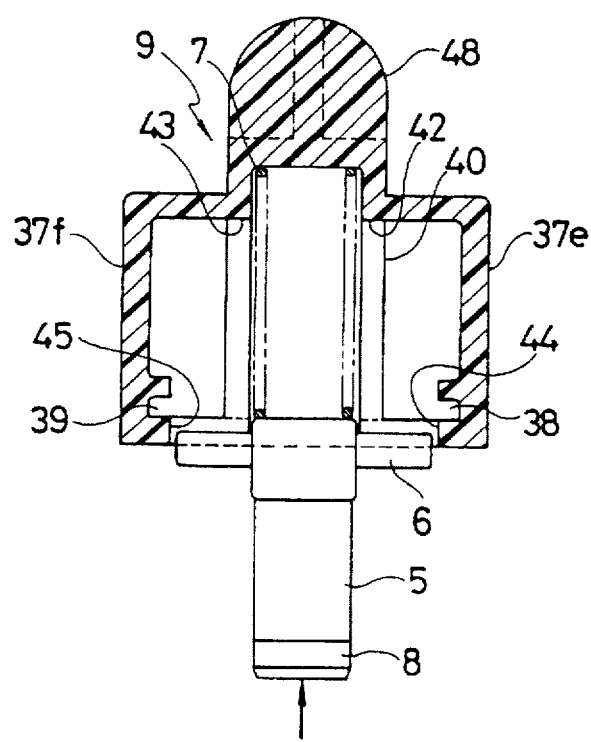
FIG. 9 is a sectional view taken along the line IX—IX in FIG. 8.
Figure 10:
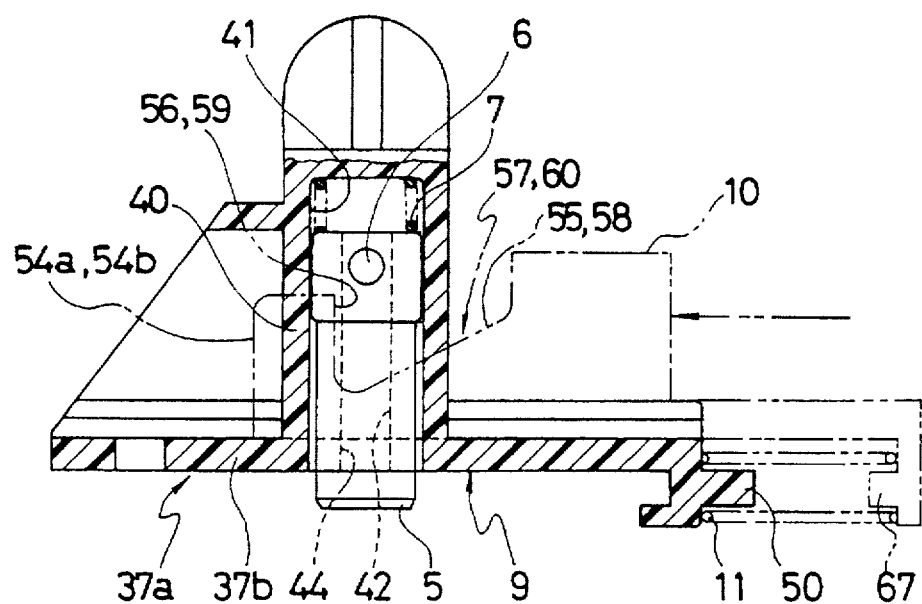
FIG. 10 is a view for explaining one example of the assembling operation of the lock pin in the embodiment shown in FIG. 1 and illustrating a state where a driven pin and a cam groove are faced each other during assembling the lock pin.

For assembling the webbing height adjuster 1, after inserting the lock pin biasing spring 7 into the axial slot 41 of the column 40 of the covering member 9 as shown in FIG. 8, the lock pin 5 in which the driven pin 6 is previously inserted into the through hole 35 thereof and the collar 8 is engaged in the annular groove 36 thereof so as to form together T-like shape is inserted into the axial slot 41 with the driven pin 6 laying in a direction perpendicular to the longitudinal direction of the covering member 9 as the mounting direction. At this point, since the driven pin 6 lays in the direction perpendicular to the longitudinal direction of the covering member 9 as shown in FIG. 9, the driven pin 6 fits in the openings 44, 45 of the bottom plate 37b and the openings 42, 43 of the side walls of the column 40 so that the driven pin 6 is smoothly inserted into the openings 44, 45, 42, 43 and the lock pin 5 is easily inserted into the axial slot 41. As shown in FIG. 10, the lock pin 5 is inserted by such an amount that the driven pin 6 is located at a level higher than the side walls 54a, 54b of the lock pin control slider 10 and is held at the position.

After that, in a state where one end of the return spring 11 is supported by the spring support projection 50 of the covering member 9 and the other end of the return spring 11 is supported by the spring support projection 67 of the lock pin control slider 10, the guides 61, 62 of the lock pin control slider 10 are inserted into the guide grooves 38, 39 of the covering member 9 and then the lock pin control slider 10 are slid along the guide grooves 38, 39 toward the box-like portion 37a of the covering member 9. At this point, since the small arc-like projections 63, 64, 65 of the guides 61, 62 come into contact with the vertical faces of the guide grooves 38, 39, the lock pin control slider 10 is prevented from tilting relative to the longitudinal direction of the covering member 9 so as to allow the lock pin control slider 10 to smoothly slide.

As shown, while the lock pin control slider 10 is held at this position where the vertical faces 56, 59 of the cam grooves 57, 60 of the lock pin control slider 10 pass through the driven pin 6, the hold of the lock pin 5 is released so that the lock pin 5 moves in such a direction as to slip off the axial slot 41 by the biasing force of the lock pin biasing spring 7, that is, downward in FIG. 10. As the driven pin 6 comes into contact with the slant faces 55, 58 of the cam grooves 57, 60, the lock pin 5 is prevented from moving downward and the driven pin 6 is held in a state where it engages the cam grooves 57, 60. After that, by releasing the hold of the lock pin control slider 10, the lock pin control slider 10 moves in such a direction as to slip off the covering member 9 by the biasing force of the return spring 11, that is, rightward in FIG. 10. As the vertical faces 56, 59 of the cam grooves 57, 60 come into contact with the driven pin 6, the lock pin control slider 10 is prevented from further moving rightward and the vertical faces 56, 59 of the cam grooves 57, 60 are held in a state where they engage the driven pin 6. In this manner, the lock pin 5 in which the driven pin 6 and the collar 8 are previously assembled, the lock pin biasing spring 7, the lock pin control slider 10, and the return spring 11 are assembled to the covering member 9 as shown in FIG. 4. In the state shown in FIG. 4, the driven pin 6 is positioned at the lowermost position of the cam grooves 57, 60 and the lock pin 5 thus protrudes fully from the covering member 9.

On the other hand, the backlash and noise eliminator 4 is assembled in such a manner as to bring it into close contact with the surface of the lock pin adjusting slider 3, on which the pair of U-like grooves 24, 25 are formed, in such a position that the holes 32, 33, 34 correspond to the holes 26, 27, 28, respectively. Then, the cover member 9 in which the lock pin 5 and the lock pin control slider 10 are already assembled as described above is assembled onto the lock pin adjusting slider 3. As shown in FIG. 2 and FIG. 4, the engaging groove 52 of the covering member 9 is engaged to the end of the body 23 of the lock pin adjusting slider 3 and the rivet hole 53 of the covering member 9 is fit on the rivet hole 27 of the lock pin adjusting slider 3. After that the rivet 14 is inserted into the rivet holes 53, 27 and is fixed. In this manner, the covering member 9 is assembled to the lock pin adjusting slider 3. Where the rivet holes 27, 53 are fit on, the axial slot 41 are fit on the hole 26 of the lock pin adjusting slider 3. Therefore, when the covering member 9 is assembled to the locking adjusting slider 3, the lock pin 5 passes through the hole 26, 32 to project therefrom as shown in FIG. 2.

Then, the engaging portions 69, 70 of the cover plate 13 are engaged into the mounting grooves 46, 47 of the box-like portion 37a, respectively and the through hole 68 of the cover plate 13 is fit on the nut through hole 28 of the lock pin adjusting slider 3. After that, the thread portion 12b of the nut 12 is inserted into the hole 34 and the nut through hole 28 from the lock pin adjusting slider 3 side as shown in FIG. 2 and the bolt 73 is screwed into the nut 12, thereby fixing the lock pin adjusting slider 3 and the cover plate 13 between the head 73a of the bolt 73 and the head portion 12a of the nut 12. In this manner, the lock pin 5, the covering member 9, the lock pin control slider 10, and the cover plate 13 are assembled to the lock pin adjusting slider 3. It should be noted that the slip anchor 75 supporting and guiding the webbing 74 is mounted to the head 73a of the bolt 73 in such a manner as to rotate in the axial direction of the bolt 73 as shown in FIG. 2.

By engaging the U-like grooves 24, 25 of the lock pin adjusting slider 3 in the aforementioned state into the rail portions 16, 17 of the guide rail 2, respectively, the lock pin adjusting slider 3 is slidably assembled into the guide rail 2. In this state, the groove forming parts 30, 31 of the backlash and noise eliminator 4 are disposed between the U-like grooves 24, 25 and the rail portions 16, 17 so that the lock pin adjusting slider 3 can be assembled into the guide rail 2 without any backlash and noise.

On the other hand, the operational member 76 is assembled into the slider garnish 71 by engaging the guiding portions 76b of the operational member 76 into stopper guides of the slider garnish 71 and bringing the knob 76a into contact with the ribs 83.

The guide rail 2 is fixed to a potion of the vehicle body such as a predetermined position of a center pillar 80 by mounting bolts 77, 78 in such a manner that the slopes 19 of the engaging holes 18 are positioned in the upper side as shown in FIG. 2. After that, the slider garnish 71 assembled with the operational member 76 is fixed to the slider garnish mount portion 48 of the covering member 9. In this manner, the webbing height adjuster 1 of this embodiment is assembled. Finally, a center pillar garnish 79 is mounted to the center pillar 80 to cover portions other than the operating portion 71a of the slider garnish 71, the webbing through hole 72, and the knob 76a of the operational member 76.

It should be noted that the operational member 76 and the lock pin control slider 10 may be integrally formed, in other words, the lock pin control slider 10 may be designed to function as the operational member 76 in addition to its function.

The description will now be made as regard to the operation of the webbing height adjuster 1 of this embodiment as described above.

As shown in FIG. 2, suppose the webbing height adjuster 1 is in a state where the lock pin 5 is engaged to the second uppermost engaging hole 18 so that the lock pin adjusting slider 3 can not move up and down. In this state, the slip anchor 75 can not move up and down and the position thereof is fixed. When it is necessary to lower the position of the slip anchor 75 from this position in order to fit with the body of the occupant who is small such as a child, the operational member 76 are pressed downward and the lock pin control slider 10 is moved downward with the operational member 76. At this point, since the operational force of the operational member 76 is transmitted substantially equally to the both side walls 54a and 54b by the connection 54c, the lock pin control slider 10 can smoothly slide. As the lock pin control slider 10 is moved downward, the driven pin 6 is guided by the slant faces 55, 58 of the cam grooves 57, 60 to move leftward in FIG. 2, thereby also moving the lock pin 5 leftward, that is, in such a direction that the lock pin 5 slips off the engaging hole 18. The lock pin 5 completely slips off the engaging hole 18 when the driven pin 6 reaches the uppermost position of the slant faces 55, 58 of the cam grooves 57, 60 as shown by two-dotted lines by the further downward movement of the lock pin control slider 10. This makes the lock pin adjusting slider 3 slidable up and down. In this state, the lock pin adjusting slider 3 is moved downward by pressing the slider garnish 71 and the operation member 76 downward with grasping the operating portion 71a of the slider garnish 71.

By releasing the operation member 76 when the webbing is in the best position to fit with the body of the occupant, the lock pin control slider 10 moves upward by the biasing force of the return spring 11 and the lock pin 5 moves rightward by the biasing force of the lock pin biasing spring 7. When the lock pin 5 completely faces one of the engaging holes 18 at this point, the lock pin 5 engages into the engaging hole 18 so as to prevent the lock pin adjusting slider 3 from moving up and down. In such a manner, the slip anchor 75 is held in another position where the webbing successfully fits with the body of the occupant. On the other hand, when the lock pin 5 faces a part of guide rail 2 between the adjacent engaging holes 18 and 18, the lock pin 5 comes into contact with the guide rail 2 not to engage into one of the engaging holes 18. In this case, by moving the slider garnish 71 up or down to finely adjust the position of the lock pin 5, the lock pin 5 is engaged into one of the engaging holes 18. In such a manner, the webbing is in such a position that substantially fits with the body of the occupant.

It should be noted that the lock pin adjusting slider 3 is prevented form moving downward because the lock pin adjusting slider 3 comes into contact with the stopper 20.

When it is necessary to rise the position of the slip anchor 75 from the position shown in FIG. 2 in order to fit with the body of the occupant such as an adult of a big body, the operational member 76 are pressed downward so that the lock pin 5 completely slips off the engaging hole 18 to allow the vertical movement of the lock pin adjusting slider 3 in the same manner as the case of lowering the slip anchor 75. In this state, in the inverse manner of the case of lowering the slip anchor 75 described above, the lock pin adjusting slider 3 is moved upward by pressing the slider garnish 71 together with the operational member 76 upward. Since the operation after that is completely the same as the case of lowering the position of the slip anchor 75, the description will be omitted. It should be noted that even when the lock pin 5 is engaged into the engaging hole 18 other than the engaging hole 18 shown in FIG. 2, the webbing height adjuster 1 operates in the same manner.

In the webbing height adjuster 1 of this embodiment as structured above, for assembling the lock pin 5 already fixed with the driven pin 6 to the lock pin control slider 10, the lock pin 5 is pressed into the axial slot 41 of the covering member 9 with the driven pin 6 laying in the direction perpendicular to the longitudinal direction of the lock pin control slider 10 as the original mounting direction of the driven pin 6 until the both side walls 54a, 54b of the lock pin control slider 10 are allowed to pass through under the driven pin 6. After that, the lock pin control slider 10 is slid relative to the covering member 9 until the cam grooves 57, 60 face the driven pin 6. In this manner, the lock pin 5 can be assembled into the lock pin control slider 10. That is, only by linear movement of the lock pin 5 and the lock pin control slider 10, the lock pin 5 can be easily assembled into the lock pin control slider 10. Therefore, since it is no longer necessary to rotate the lock pin, there is no rotational operation of the lock pin like the prior art as mentioned above, thereby facilitating the assembly of the lock pin very much and decreasing the number of the assembly steps.

Since the slant faces 55, 58 of the cam grooves 57, 60 are designed to have a predetermined length for guiding the driven pin 6, the length of the cam grooves 57, 60 in the longitudinal direction of the lock pin control slider 10 is designed to be significantly large. Therefore, it is not necessary to highly precisely position the driven pin 6 and the cam grooves 57, 60 to face each other, thereby further facilitating the assembly of the driven pin 6.

Figure 11:
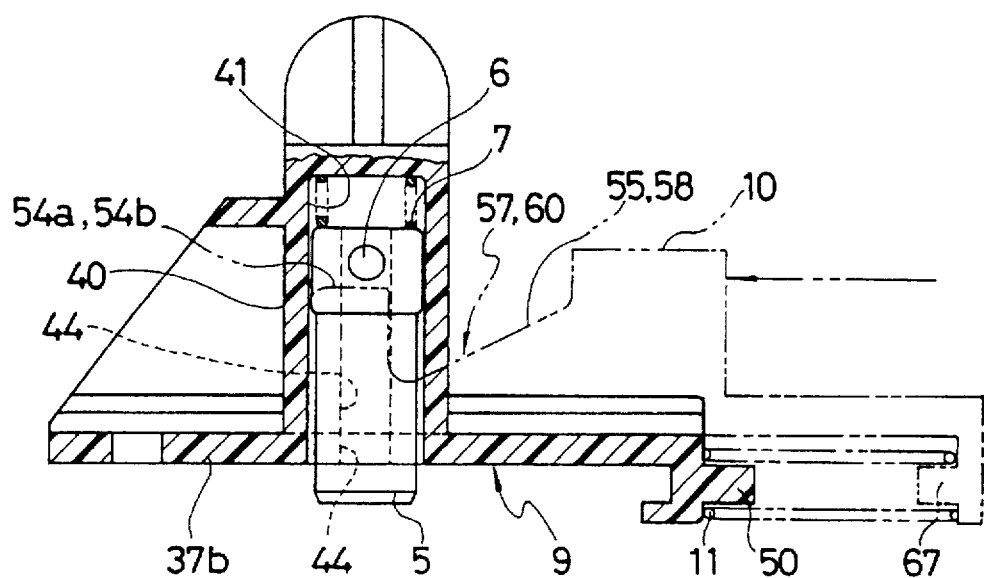
FIG. 11 is a view for explaining another example of assembling operation of the lock pin in the embodiment shown in FIG. 1 and illustrating a state where the driven pin and a portion other than the cam groove of sides of a lock pin control slider.
Figure 12:
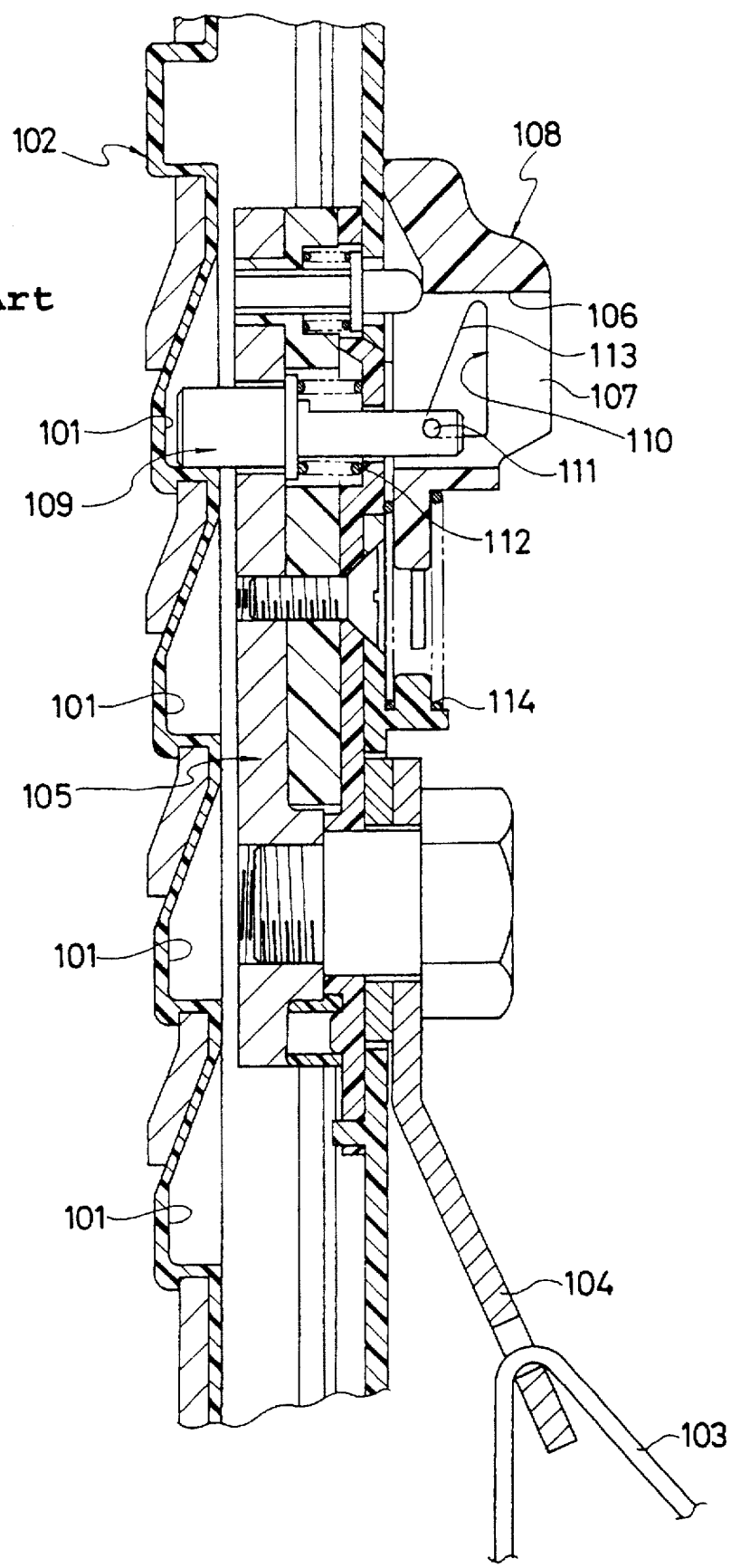
FIG. 12 is a vertical sectional view similar to FIG. 2 showing an example of the conventional webbing height adjusters.

In addition, it is not always necessary to face the driven pin 6 to the cam grooves 57, 60 and the driven pin 6 may be faced to portions other than the cam grooves 57, 60 of the side walls 54a, 54b as shown in FIG. 11. In this case, by releasing the lock pin 5 from being pressed, the lock pin 5 moves downward in FIG. 11 so that the driven pin 6 comes into contact with the other portions than the cam grooves 57, 60 of the side walls 54a, 54b. When the driven pin 6 is in contact with the parts of the side walls 54a, 54b, the lock pin control slider 10 may be just further pushed into the covering member 9 for assembling the lock pin 5 to the covering member 9. This also further facilitates the assembly of the driven pin 6.

Further, since this embodiment allows the driven pin 6 to be previously assembled to the lock pin 5, the assembly of the driven pin in the assembly line is no longer needed, thereby decreasing the number of the working steps in the assembly line.

Furthermore, since the driven pin 6 is positioned in the box-like portion 37a of the covering member 9, the driven pin 6 is hidden by the covering member 9, thereby improving the appearance.

Since the lock pin 5 is guided by the inner surface of the axial slot 41 of the column 40, the lock pin 5 can smoothly and securely move.

In addition, the lock pin biasing spring 7 biasing the lock pin 5 is disposed between the both side walls 54a, 54b of the lock pin control slider 10, thereby allowing the lock pin 5 to have shorter length. This also reduces the thickness of the webbing height adjuster 1 and facilitates the mounting of the webbing height adjuster even when it should be mounted on a narrow portion of the vehicle body such as a center pillar.

Since the cover plate 13 blocks the sight from the cabin through the webbing through hole 72 of the slider garnish 71, the guide rail 2 is hidden, thereby improving the appearance even when the lock pin adjusting slider 3 is positioned at any place of the guide plate 2.

As apparent from the above description, according to the webbing height adjuster of the present invention, it no longer necessitate the rotational operation of the lock pin for assembling the lock pin, thereby facilitating the assembly of the lock pin and decreasing the number of the assembly steps. Therefore, this improve the assembly property of the lock pin.

According to the present invention, the driven pin is hidden by the covering member, thereby improving the appearance.

According to the present invention, the lock pin can be smoothly and securely operated.

What we claim is:

1. A webbing height adjuster comprising:
   a guide rail fixed to a vehicle body and provided with a predetermined number of engaging portions formed in a longitudinal direction;
   a movable member disposed on the guide rail to be slidable in the longitudinal direction and on which a webbing support is mounted;
   a lock pin disposed in the movable member to be movable in directions of engaging and slipping off one of said engaging portions;
   biasing means always biasing the lock pin in a direction of engaging one of the engaging portions;
   a control member slidably mounted on said movable member and having a pair of side walls to sandwich said lock pin, each of said side walls having a notched groove which opens in the slipping off direction and a cam face formed in the notched groove, said control member controlling a movement of said lock pin in the directions of engaging and slipping off by sliding relative to said movable member; and
   a driven pin mounted to said lock pin to form a T-shape together with said lock pin, end portions of the driven pin engaging said cam faces to be driven by a movement of the cam faces due to the sliding of said control member.

2. A webbing height adjuster as claimed in claim 1, wherein said movable member is provided with a covering member at a position where said lock pin is mounted, and the covering member is formed in a box shape having a rectangular section comprising a bottom plate, two side plates, and a top plate and is opened in a sliding direction of said control member, a portion of said lock pin passes through said bottom plate of said covering member to be positioned inside said covering member, said bottom plate of said covering member is provided with a first opening allowing said driven pin to pass therethrough in such a direction that said driven pin engages said cam faces, and said control member is slidably mounted to said covering member.

3. A webbing height adjuster as claimed in claim 2, wherein said covering member is provided with a cylindrical column between said bottom plate and said top plate, a portion of said lock pin positioned inside said covering member is slidably inserted into said column, and said column is provided with a second opening allowing sliding of said driven pin and formed continuously with said first opening of said bottom plate in the longitudinal direction of said column.

4. A webbing height adjuster as claimed in claim 1, wherein said movable member includes a covering member with a groove so that before the control member is assembled with the movable member, the lock pin and the driven pin in the T-shape slide in the covering member, and then, when the control member is inserted into the covering member, the driven pin is placed on and engaged with the cam faces.

* * * * *